(12) United States Patent
Hall et al.

(10) Patent No.: US 6,569,480 B2
(45) Date of Patent: May 27, 2003

(54) LIQUEFIED GAS EXTRACTION PROCESS

(76) Inventors: Donald R. Hall, 33 Herons Nest, Savannah, GA (US) 31410-3331; Michael R. Hall, 1108 Lora St., Savannah, GA (US) 31410-1821; Michael Moser, 435 Sumter St., SE., Alken, SC (US) 29801; L. V. Benningfield, Jr., 4300 San Mateo Blvd., NE., Albuquerque, NM (US) 87110

( * ) Notice: Subject to any disclaimer, the term of this patent is extended or adjusted under 35 U.S.C. 154(b) by 157 days.

(21) Appl. No.: 09/845,709

(22) Filed: Apr. 30, 2001

(65) Prior Publication Data

US 2002/0160087 A1 Oct. 31, 2002

(51) Int. Cl.$^7$ ................................. C11B 1/00
(52) U.S. Cl. ....................... 426/417; 426/489; 426/495; 426/430; 426/442; 554/9; 554/12; 554/16; 554/20
(58) Field of Search ................................. 426/417, 489, 426/495, 593, 629, 430, 442; 554/8, 9, 12, 16, 20

(56) References Cited

U.S. PATENT DOCUMENTS

| | | | |
|---|---|---|---|
| 1,802,533 A | | 4/1931 | Reid |
| 2,560,935 A | | 7/1951 | Dickinson |
| 3,923,847 A | | 12/1975 | Roselius et al. |
| 3,966,982 A | * | 6/1976 | Becker ................ 426/430 |
| 3,972,861 A | | 8/1976 | Gardner, Jr. et al. |
| 3,994,943 A | | 11/1976 | Gibble et al. |
| 4,331,695 A | | 5/1982 | Zosel |
| 4,466,923 A | | 8/1984 | Friedrich |
| 4,554,170 A | | 11/1985 | Panzner et al. |
| 4,698,156 A | | 10/1987 | Bumpers |
| 4,885,079 A | | 12/1989 | Eppig et al. |
| 4,975,183 A | | 12/1990 | Glorer |
| 5,041,245 A | | 8/1991 | Benado |

(List continued on next page.)

FOREIGN PATENT DOCUMENTS

| | | |
|---|---|---|
| GB | 1356750 | 6/1974 |
| WO | WO 93/13035 A1 | 7/1993 |

OTHER PUBLICATIONS

Council Directive 88/344/EEC, Jun. 13, 1988.
Godfrey, J.C. & Slater, M.J., "Solvent Extraction Equipment: Co–current flow systems for liquid–liquid extraction", *Chem. & Indus.*, 19:745, 1978.
Heidlas, Jurgen, "Propane Extraction in Food Processing", *Food Mktg. & Tech.*, pp. 38–43, Dec. 1994.

(List continued on next page.)

*Primary Examiner*—Carolyn Paden
(74) *Attorney, Agent, or Firm*—Caesar, Rivise, Bernstein, Cohen & Pokotilow, Ltd.

(57) ABSTRACT

A process for extracting a fat from a feedstock (e.g., chocolate liquor), includes mixing the feedstock with a liquefied gas solvent (e.g., butane), filtering, washing the retentate with additional solvent, refiltering, drying, granulating, aerating the granulate, and separating the fat from the solvent in the original filtrate. The mixing, filtering, washing, refiltering, drying, and granulating are conducted under an atmosphere consisting essentially of the solvent vapor. An improved solvent extraction process includes repeatedly loading and unloading an extractor with solvent and feedstock to extract fat from the feedstock, wherein throughout loading, extracting, unloading and repeating: (a) a pressure in the extractor is continuously maintained above atmospheric pressure; (b) the extractor is continuously maintained under an oxygen-free atmosphere; and/or (c) the extractor is continuously maintained under an atmosphere consisting essentially of a vapor of the solvent.

52 Claims, 6 Drawing Sheets

U.S. PATENT DOCUMENTS

| | | | |
|---|---|---|---|
| 5,138,075 | A | 8/1992 | Ohgaki et al. |
| 5,169,968 | A | 12/1992 | Rice |
| 5,281,732 | A | 1/1994 | Franke |
| 5,290,959 | A | 3/1994 | Rice |
| 5,389,244 | A | 2/1995 | Cranston |
| 5,405,633 | A | 4/1995 | Heidlas et al. |
| 5,516,923 | A | 5/1996 | Hebert et al. |
| 5,525,746 | A | 6/1996 | Franke |
| 5,707,673 | A | 1/1998 | Prevost et al. |
| 5,739,364 | A | 4/1998 | Franke |
| 5,980,964 | A | 11/1999 | Walters et al. |
| 6,066,350 | A | 5/2000 | Purtle et al. |
| 6,111,119 | A | 8/2000 | Trout |
| 6,248,910 | B1 * | 6/2001 | Franke .................. 554/12 |
| 6,313,328 | B1 * | 11/2001 | Ulrich et al. .................. 554/13 |
| 6,361,814 | B2 * | 3/2002 | Purtle et al. .................. 24/611 |
| 2002/0012740 | A1 * | 1/2002 | Benado .................. 426/632 |

OTHER PUBLICATIONS

MacGee, A.E., Vegetable Oil Extraction Solvents; History and General Chemical Composition, *Oil Mill Gazetteer*, pp. 17–21, 36–43, Aug., 1947.

Pyatt et al., "Liquefied–Gas Extraction of Oils for Application in the Food Industry", *Technology and Solvents for Extracting Oilseeds and Nonpetroleum Oils*, AOCS Press, Chapter 15, 1997.

Rossi, Margherita, "Supercritical Fluid Extraction of Cocoa and Cocoa Products", *Supercritical Fluid Technology in Oil and Lipid Chemistry*, Chapter 10, 1996.

Trout, Richard, "Manufacturing Lowfat Cocoa", *The Mfg. Confectioner*, pp. 75–82, Jun., 2000.

"Fat–Free: It's a Gas", *Food & Beverage Marketing*, Aug. 1996.

"Filtration, Filtration Media and Filtration Equipment", *Perry's Chem. Eng'g. Handbook*, $6^{th}$ Ed., pp. 19–65, 1984.

"Funda Filters by Steri", www.steri.com, 2001.

"Food Expo", *Food Technology*, Aug., 1996.

"New Fat Solvent System", *Int'l. Food Mfg.*, No. 4, p. 18, 1996.

"Removing Fat Via Liquefied Gas–Solvent Extraction", *Food Eng'g.*, pp. 27–28, Jul./Aug., 1996.

"Solid Liquid Extraction–Principles of the Process", www.RCCostello.com, 2001.

*Encyclopedia of Chemical Technology*, $3^{rd}$ Ed., vol. 6, pp. 10–11, 1979.

*Encyclopedia of Chemical Technology*, $3^{rd}$ Ed., vol. 15, pp. 612–617, 1979.

*Handbook of Butane–Propane Gases*, $2^{nd}$ Ed., pp. 9–10, 24–25, 29, 1938.

* cited by examiner

LIQUEFIED GAS EXTRACTION PROCESS

BACKGROUND OF THE INVENTION

1. Field of Invention

This invention relates to solvent extraction of fats and/or oils from products containing fats and/or oils, wherein the extraction solvent is a liquefied gas.

2. Description of Related Art

A variety of methods have been developed for extracting edible fats and oils from materials containing them. These methods fall into two classes: (1) mechanical extraction methods; and (2) solvent extraction methods. Mechanical extraction methods employ pressure to squeeze fats and oils from oleaginous materials. Solvent extraction methods separate fats and oils from oleaginous materials by contacting the oleaginous materials with a solvent in which fats and oils are more soluble than other components of the oleaginous materials, separating the solvent and fat/oil solution (i.e., miscella) from the defatted material and separating the fat/oil from the solvent.

Extraction methods have been employed to extract edible fats and oils from a wide variety of materials, including animal flesh, oilseeds and plant matter, such as cereal brans, fruits, beans and nuts. See, e.g., U.S. Pat. No. 1,802,533 to Reid, U.S. Pat. No. 2,560,935 to Dickinson, U.S. Pat. No. 5,041,245 to Benado, U.S. Pat. No. 5,980,964 to Walters et al., U.S. Pat. No. 6,066,350 to Purtle et al. and U.S. Pat. No. 6,111,119 to Trout.

For example, cocoa beans are processed to obtain cocoa butter and cocoa powder. Cocoa butter represents a portion of the fat content isolated from the cocoa beans. The cocoa powder represents solids remaining after processing to recover cocoa butter.

In typical processing, the cocoa beans are harvested within a husk. Typically, the beans are dried in the fields, and then dehusked. The beans are then subjected to various forms of heating, for example, intense infrared treatment, to pop the shells and in some instances for microbiological control. The shelled beans are generally referred to as cocoa nibs. The nibs are separated from the shells for processing.

In typical processing operations, the nibs are roasted and in some instances subjected to dutching (alkali treatment or alkalization). The nibs are then ground, often with significant generation of heat.

In general, the mass which results from grinding of the nibs is referred to as "cocoa mass", "cocoa liquor" or "chocolate liquor". At room temperature, it is a thick solid mass; however, when heated above the melting point of the fat it forms a viscous, flowable slurry. Typical cocoa liquors contain about 50–58 wt. % fat and 42–50 wt. % powder (or remaining solids). The fat content of cocoa liquor is that portion generally referred to as "cocoa butter", after it has been separated from the remainder of the mass.

In conventional mechanical or "press" processing, chocolate liquor is mechanically pressed, to physically squeeze a portion of the fat out. In some instances the mass may be washed, to modify flavor or color. Generally up to about 80–85 wt. % of the fat content (of the 50–60 wt. %) can be removed from the cocoa mass by mechanical pressing. This typically leaves a cake comprising about 10–20 wt. % cocoa butter (often 11–12 wt. %), by weight, the remainder comprising cocoa powder. Cocoa powder with a fat content of about 10 wt. % or below is often referred to as low-fat cocoa powder. The fat which is isolated by mechanical pressing is typically called "press butter". The time and pressure it takes to remove the fat by pressing increases substantially when the process is practiced to reduce the residue cake from about 20 wt. % fat content to about 11 wt. % fat content or lower. In addition, mechanical press extraction tends to increase the likelihood of bacterial contamination.

Cocoa beans have been processed by pressing generally in the manner described above for many decades to produce two principal commodities—the cocoa butter isolated from the pressing steps and the cocoa powder (typically containing about 10–20 wt. % cocoa fat by weight).

In some applications, the fat content (10–20 wt. %) of the cocoa powder has been found undesirable. Such applications include those in which it is desired that the ultimate food product which is manufactured contain relatively low amounts of various added fats or oils. In recent years, then, processes of reducing the fat content of cocoa powder have been examined.

In general, fat-free cocoa powders, i.e., cocoa powders containing no more than about 0.5% by weight cocoa butter, have been produced by extracting the cocoa powder obtained after pressing, via solvent extraction. Hexane and carbon dioxide, for example, have been used to extract cocoa butter from cocoa feedstocks, but have been less than totally satisfactory. Although hexane is a liquid at room temperature and pressure, having a boiling point well above atmospheric pressure, it has been classified as a hazardous air pollutant under the Clean Air Act, and has been implicated as a neurotoxin. Carbon dioxide extraction of cocoa butter can require large investments in systems capable of withstanding the high pressures required by extraction with carbon dioxide in its supercritical fluid state.

Despite the foregoing developments, it is desired to provide a system for extracting greater amounts of fats and/or oils from materials containing fats and/or oils than has been practical with mechanical pressing systems.

It is also desired to provide an extraction system in which toxic solvents are avoided and flammable solvents are employed safely and effectively.

It is further desired to provide an extraction system in which the capital expenditures for construction are less than those for constructing mechanical press systems and supercritical carbon dioxide fluid extraction systems.

It is still further desired to provide an extraction system in which the operating costs are less than those of mechanical press systems.

All references cited herein are incorporated herein by reference in their entireties.

BRIEF SUMMARY OF THE INVENTION

The invention provides a process for extracting a fat from a feedstock, said process comprising:

mixing said feedstock with a solvent to form a primary slurry of feedstock solids suspended in a primary miscella comprising said solvent and said fat extracted from said feedstock, wherein said solvent is a liquefied gas;

filtering said primary slurry to provide: (a) at least one primary filter cake comprising said feedstock solids and a retentate portion of said primary miscella, and (b) a primary filtrate comprising a filtrate portion of said primary miscella;

washing said at least one primary filter cake with an additional amount of said solvent to form a cake wash slurry comprising said feedstock solids suspended in a secondary miscella comprising said additional amount of said solvent and an amount of said fat extracted from said feedstock;

filtering said cake wash slurry to provide: (a) at least one secondary filter cake comprising said feedstock solids, and (b) a secondary filtrate comprising said secondary miscella;

drying said at least one secondary filter cake with a solvent vapor to provide at least one dried filter cake, wherein said solvent vapor comprises said solvent in a gaseous form;

granulating said at least one dried filter cake to form a defatted powder;

feeding said defatted powder into an oxygen-containing atmosphere at a feed rate to remove at least a portion of a residual amount of said solvent remaining in said defatted powder and provide a powder product, wherein said feeding is regulated to avoid providing a flammable concentration of said solvent in said oxygen-containing atmosphere; and separating said solvent from said fat in said primary miscella to provide a fat product, wherein said mixing, said primary slurry filtering, said washing, said cake wash slurry filtering, said drying, and said granulating are conducted under an atmosphere consisting essentially of said solvent vapor.

Further provided is a solvent extraction process comprising loading into an extractor a first batch including a feedstock and a solvent, extracting into said solvent a fat from said feedstock, unloading from said extractor said first batch after said extracting, and repeating said loading, said extracting and said unloading at least once, wherein a pressure in said extractor is continuously maintained above atmospheric pressure (i.e., above about 101.3 kPa and preferably above about 40 psig/276 kPa) throughout said loading, said extracting, said unloading and said repeating.

Still further provided is a solvent extraction process comprising loading into an extractor a first batch including a feedstock and a solvent, extracting into said solvent a fat from said feedstock, unloading from said extractor said first batch after said extracting, and repeating said loading, said extracting and said unloading at least once, wherein said extractor is continuously maintained under an oxygen-free atmosphere throughout said loading, said extracting, said unloading and said repeating.

In addition, the invention provides a solvent extraction process comprising loading into an extractor a first batch including a feedstock and a solvent, extracting into said solvent a fat from said feedstock, unloading from said extractor said first batch after said extracting, and repeating said loading, said extracting and said unloading at least once, wherein said extractor is continuously maintained under an atmosphere consisting essentially of a vapor of said solvent throughout said loading, said extracting, said unloading and said repeating.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Although the method and apparatus of the invention will be described with reference to a preferred embodiment particularly suited to extracting cocoa butter from cocoa liquor using liquefied butane as the extraction solvent, the invention is not intended to be limited thereto.

Thus, the invention is also suitable for extracting fats and/or oils (collectively referred to throughout this entire document as "fat(s)" unless noted otherwise) from other feedstocks, including, e.g., vegetable and animal matter in cooked and uncooked forms. The invention is also suitable for extracting fats from minerals and other inorganic materials. Cocoa bean derived feedstocks are preferred, including, e.g., cocoa nibs, partially defatted cocoa powder (i.e., standard 10/12 wt. % cocoa powder), ground low-value cocoa beans and cocoa bean shells, with chocolate liquor being the most preferred feedstock.

Although cocoa butter is the preferred fat to be extracted by the inventive process, other suitable fats include, e.g., peanut oil, soybean oil, corn oil, rapeseed oil, flaxseed oil, cottonseed oil, olive oil, rice bran oil, linseed oil, palm oil, coconut oil, sunflower oil, safflower oil and canola oil.

Suitable solvents for use in the invention are those generally recognized as safe (GRAS) for human consumption, and include, e.g., the solvents approved in Council Directive 88/344/EEC of Jun. 13, 1988 for solvent extraction of foodstuffs and food ingredients. Preferred solvents are liquefied gases. A liquified gas is defined for present purposes as a liquid form of a substance, which is gaseous at 1 atmosphere and 20° C. Alkanes having a carbon number less than six are more preferred, with propane being even more preferred and butane (i.e., normal and/or isobutane as used herein) being most preferred. Solvents can comprise a mixture of substances or a single substance.

Figure 1A:
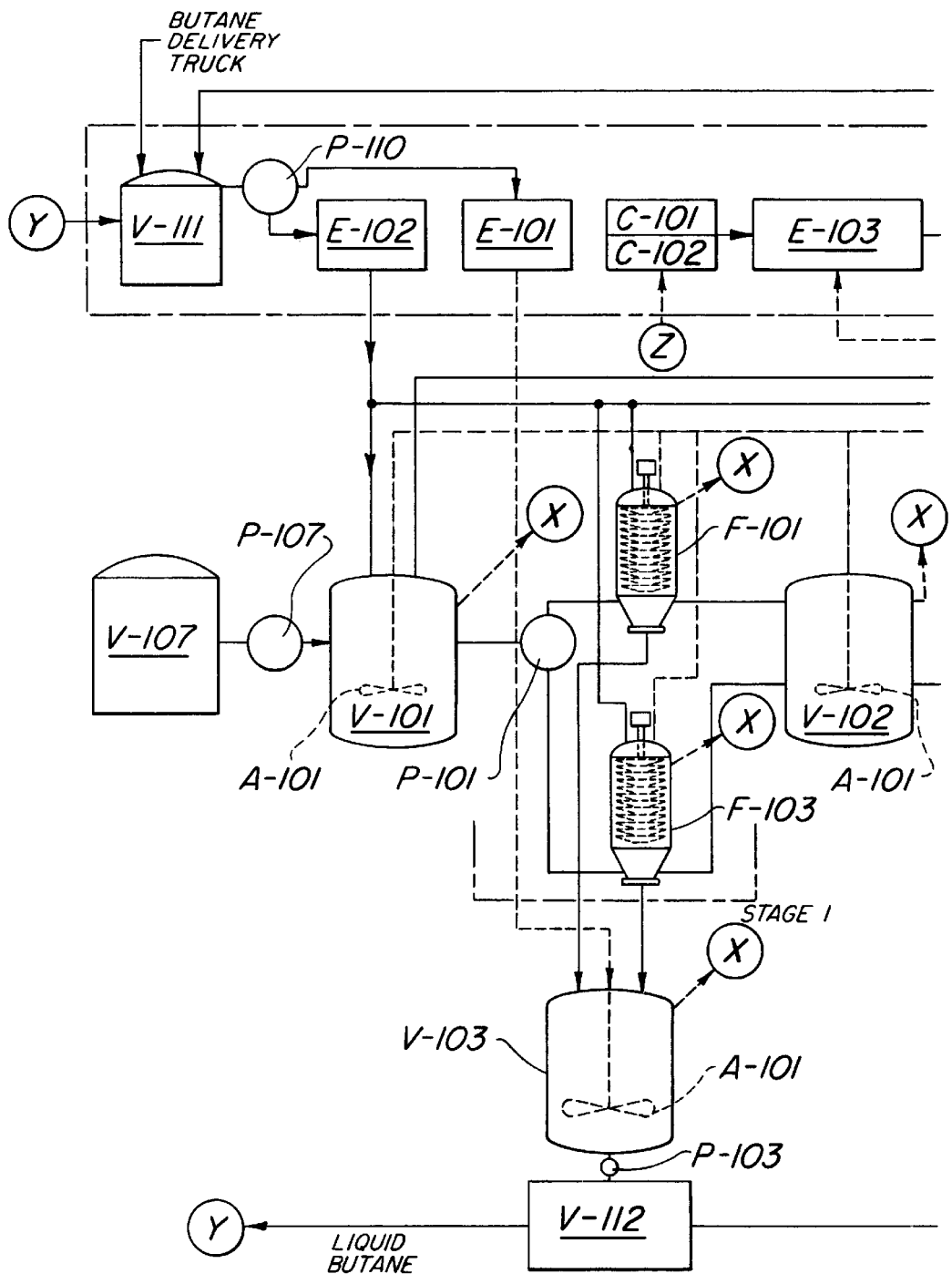
FIG. 1 is a schematic flow diagram of a preferred embodiment of the invention.
Figure 1B:
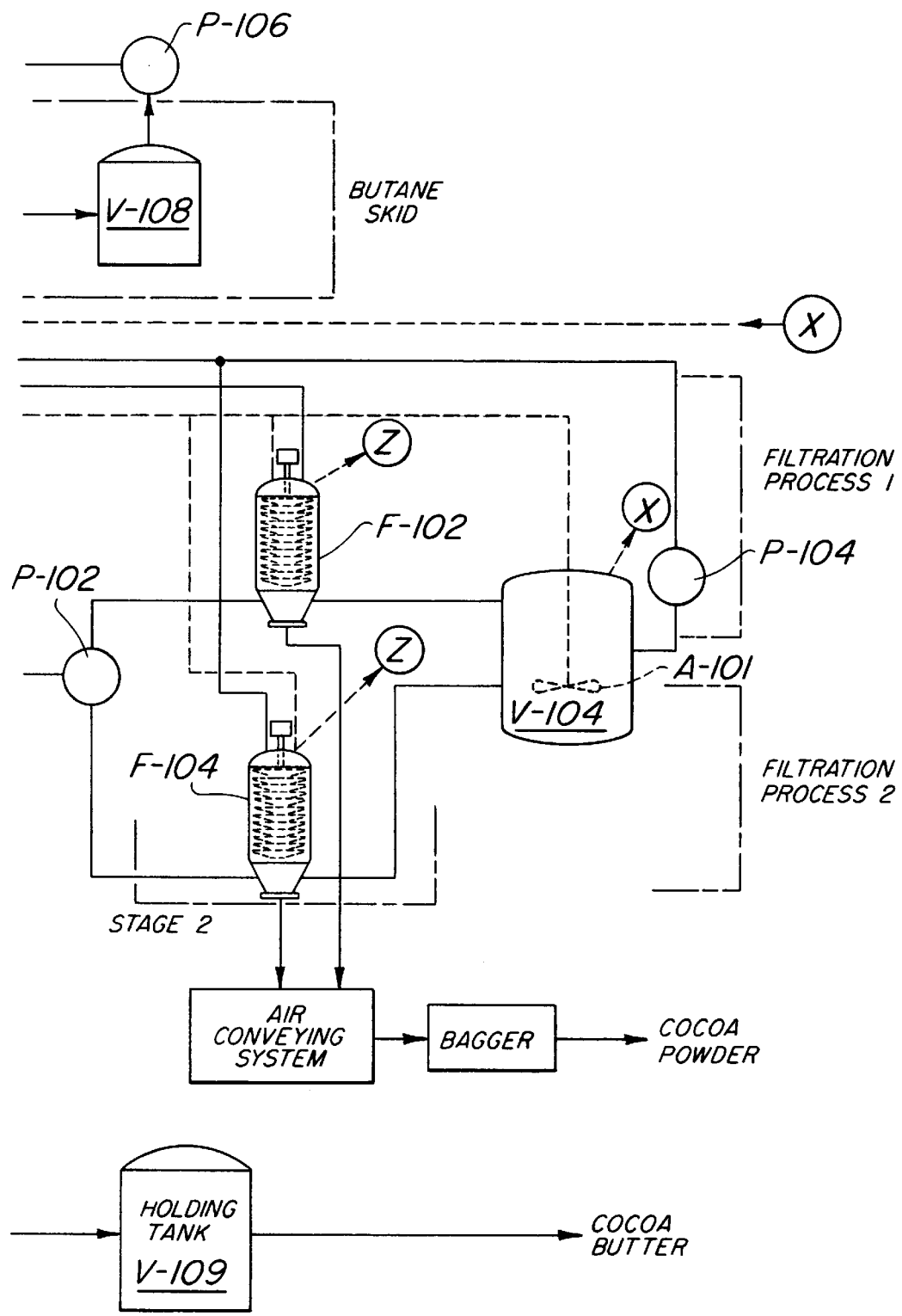

Referring to FIG. 1, chocolate liquor is delivered to liquor holding tank V-107, where the liquor is stored at a temperature of about 110–140° F. (43–60° C.) and mixed to maintain the liquor as a relatively homogeneous mixture. It is preferred to provide at least two liquor holding tanks, which are isolated from each other. Chocolate liquor from a first source is introduced into one tank, and is isolated from chocolate liquor from a second source in a second tank, thereby preventing cross-contamination between different liquor production and suppliers.

The temperature of liquor holding tank V-107 is selected to maintain its contents in a fluid state. In the case of chocolate liquor, higher temperatures can damage the fatty acids in the liquor, and temperatures lower than 90° F. (32° C.) can result in solidification of the liquor, hindering its ability to flow through the system. All equipment and pipes should be heated and/or insulated, if necessary, to prevent solidification of materials passing therethrough. For example, in the case of chocolate liquor extraction, the equipment, including pipes, through which materials containing cocoa butter pass should be maintained at a temperature of at least 90° F. (32° C.). Otherwise, cocoa butter could begin to solidify at 85–88° F. (29–31° C.), resulting in clogging of pipes and other equipment, and damage to pressurized equipment.

Before any cocoa butter is extracted, the entire pressurized segment of the system downstream of liquor holding tank V-107 is purged of air by butane vapor from butane vaporizer E-101. This purging is necessary only when the system is first brought online, so as to minimize the possibility of forming an explosive mixture of oxygen and butane. The system is designed to prevent the influx of air into the system through multiple loadings of feedstock and multiple unloadings of products. Butane vaporizer E-101 produces butane vapor at a pressure of about 40–70 psig (about 276–483 kPa; unless otherwise noted, all pressures referred to herein are gauge pressure), preferably about 70 psig (483 kPa) and a temperature of about 120° F. (49° C.) and maintains the oxygen-free segment of the system under a butane vapor atmosphere of about 45–55 psig (310–379 kPa) and about 110–120° F. (43–49° C.) Unlike certain other systems, the entire oxygen-free segment of the present invention need not be completely depressurized to load or unload materials.

After liquor holding tank V-107 has been filled with chocolate liquor, the liquor is conveyed by liquor holding tank pump P-107 into the top of extractor V-101, in which it is mixed by agitator A-101 (preferably rotating blades) with liquefied butane from liquid butane heater E-102.

The inventors have discovered that combining the solvent with the feedstock at the same temperature is particularly advantageous. If the solvent and feedstock are mixed when the temperature of the solvent is lower than the temperature of the feedstock, excessive flashing of the solvent results, leading to an undesirable increase in pressure. Thus, in preferred embodiments, the liquid butane is provided in extractor V-101 at a temperature within about 10° C. of the temperature of the feedstock, and/or at a temperature of about 90–130° F. (32.2–54.4° C.), preferably about 110–120° F. (43–49° C.).

The liquefied butane is preferably introduced into the bottom of extractor V-101 (directly or via a dip tube (not shown) passing from the top of extractor V-101 to a bottom portion thereof) simultaneously (or otherwise) with the chocolate liquor, with continuous mixing by the agitator to form a slurry. After extractor V-101 is filled to about 80–90% of its volume with this slurry, the flow of liquefied butane and chocolate liquor into extractor V-101 is stopped. In embodiments employing a 1200 gallon (4542 liter) extractor, it is preferred to adjust the rate of filling such that extractor V-101 is filled to 80–90% of its capacity within about 20 minutes. It is also preferred to provide the liquefied butane and chocolate liquor at a temperature of about 90–130° F. (32.2–54.4° C.), more preferably at about 110–120° F. (43–49° C.), and to maintain that temperature in extractor V-101.

Without wishing to be bound by any theories, it is believed that extraction of cocoa butter from the chocolate liquor is completed within extractor V-101, provided that the slurry is sufficiently mixed and comprises an amount of butane sufficient to dissolve the amount of cocoa butter present. It has been found that a butane:liquor addition rate ratio of 1:1 to 5:1 and a butane:liquor weight ratio in the slurry of about 1:1 to 5:1 are preferred, with addition rate and weight ratios of 2:1 being most preferred. Of course, this ratio may be adjusted for other solvents and/or other feedstocks through routine experimentation.

In order to facilitate thorough mixing of the slurry within extractor V-101, it is preferred to provide baffles (not shown) within extractor V-101 to enhance mixing. In preferred embodiments, mixing can be further facilitated by recirculating the contents of extractor V-101 through extractor pump P-101 and back to extractor V-101. After at least 15 minutes, preferably at least 30 minutes, extraction is complete, and the slurry being passed through extractor pump P-101 is no longer recycled to extractor V-101, but rather is conveyed to first stage (or "primary") filter vessel F-103. Meanwhile, extractor V-101 is backfilled with butane vapor from butane vaporizer E-101 at a pressure of about 50–70 psig (345–483 kPa) as the slurry is drawn from extractor V-101 by extractor pump P-101. The pressure in extractor is maintained above ambient through multiple batch loadings and unloadings. Preferably, the pressure in the extractor is continuously maintained above about 40 psig (276 kPa) throughout repeated loading and unloading of the extractor. This minimum pressure value is selected to enable the system to operate without large and inefficient pressure swings between steps.

As first stage filter vessel F-103 is being filled with slurry from extractor V-101, butane vapor is recirculated back to extractor V-101 to equalize the pressure of the filter vessel with that of extractor, such that the introduction of slurry into the filter vessel does not raise the pressure above the preferred 45–55 psig (310–379 kPa). In addition, some slurry is also recirculated back to extractor V-101.

Figure 2:
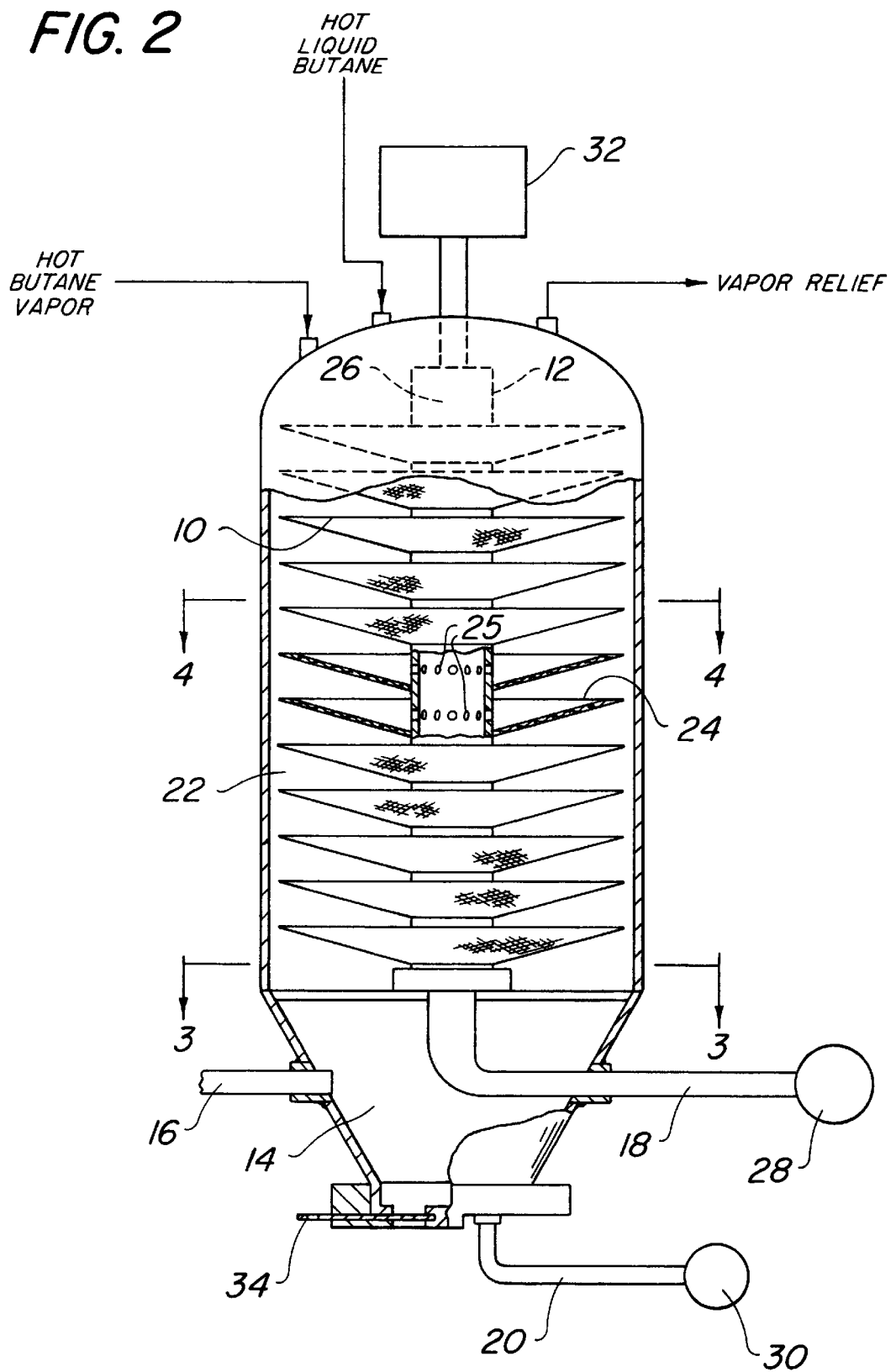
FIG. 2 is a schematic cross-sectional view of a filter vessel of the invention.
Figure 3:
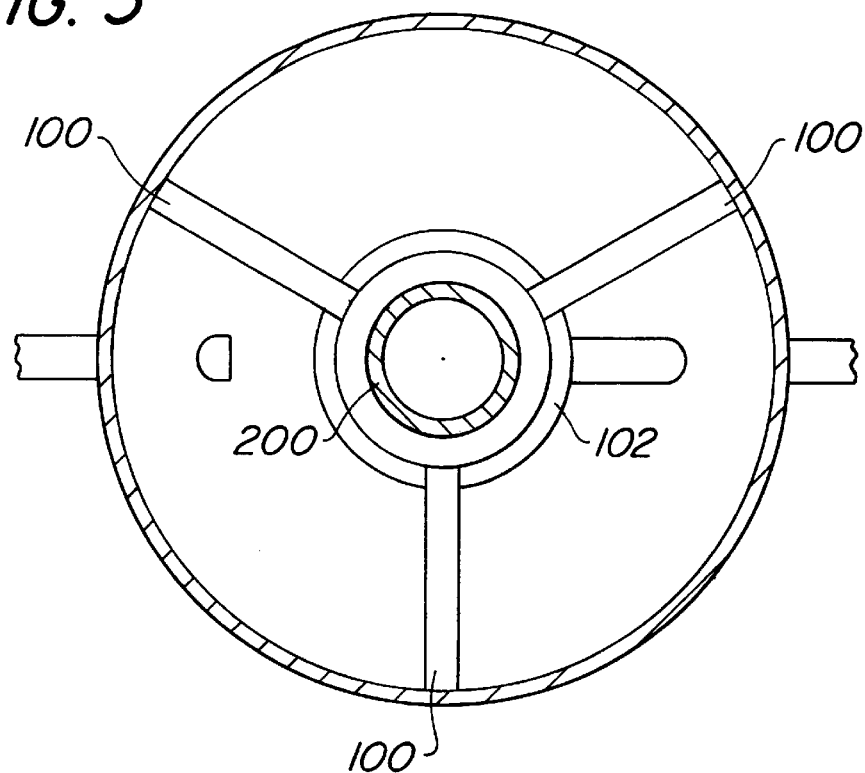
FIG. 3 is a cross-sectional view through line 3—3 of FIG. 2.
Figure 4:
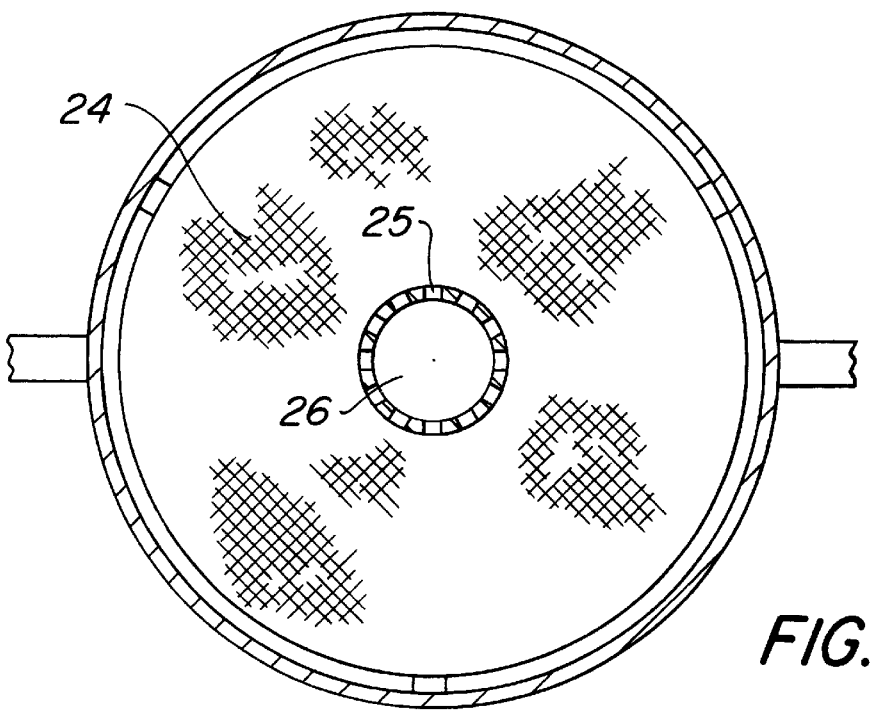
FIG. 4 is a cross-sectional view through line 4—4 of FIG. 2.

FIGS. 2–4 show a typical filter vessel suitable for use in the invention. Centrifugal discharge filter vessels, such as those available from Bird Machine Company (South Walpole, Mass.), Steri Technology (Bohemia, N.Y.), Mavag AG (Attendorf, Switzerland) and Sparkler Equipment Company (Houston, Tex.), and described in, e.g., U.S. Pat. No. 4,698,156 to Bumpers are suitable for use in the invention, subject to the modifications discussed below. The typical centrifugal discharge filter is constructed as a vertically oriented, truncated cone with the end of smaller radius downwardly located. The filter vessel includes filter plates 10 mounted as a vertical stack on filter shaft 12, which occupies the central axis of the filter vessel. Filter shaft 12 is supported above heel 14 of the filter vessel by three struts 100 radiating from collar 102 at the bottom end of filter shaft 12 to the peripheral wall of the filter vessel. The heel 14 of the first stage filter vessel includes slurry inlet 16, filtrate outlet 18 and drain pipe 20. Filter shaft is sealed at the bottom by filter seal assembly 200 held by collar 102.

Figure 6:
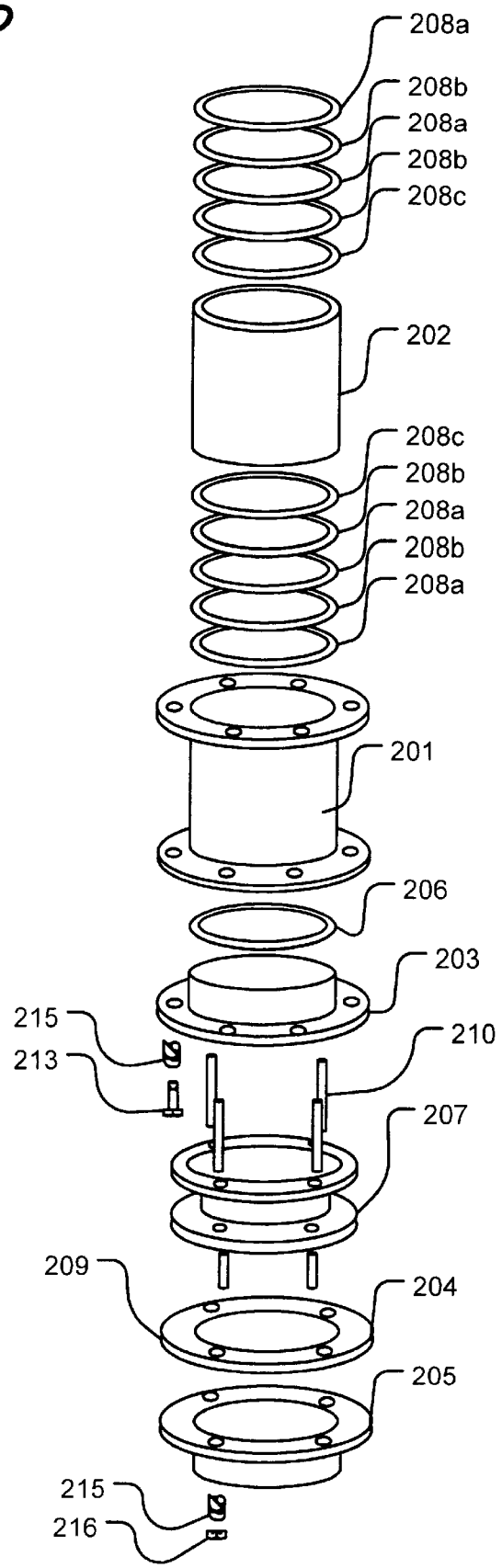
FIG. 6 is an expanded schematic view of a filter seal assembly of the filter vessel of FIG. 2.

Referring to FIG. 6, filter seal assembly 200 includes seal housing 201, bearing bushing 202, upper flange 203, lower flange 204, centering coin 205, spacer ring 206, polytetrafluoroethylene (PTFE) sleeve 207, lip seal collars 208a and 208c, lip seals 208b, four push tubes 209, four studs 210, six screws 213, four nuts 214 and ten spring washers 215.

It was found that the original factory filter seal assemblies (Mavag Lower Bearing and Seal, Part No. 713776) supplied with the commercial filter vessels were inadequate for the pressures and the fine defatted cocoa solids involved in the inventive process. Furthermore, the uneven distribution of retentate on the filter plates resulted in wobbling, from being unbalanced during rotation of the filter shaft to remove the solids from the filter plates. This in turn caused uneven wear and failure of certain components of the original factory filter seal assemblies. This failure resulted in the slurry bypassing the filter seal assembly and entering the seal housing, where defatted cocoa solids would collect and cause excessive wear to the bushings and also enter into the filtrate outlet through these failed seals. A number of modifications to the filter shaft bushings and seal arrangements in the filter vessels solved these problems.

The original factory PTFE bearing bushings were redesigned. PTFE bushings have suitable durability for most applications, but the PTFE material has a tendency to cold flow when the aforementioned wobbling occurs. After testing several different materials for their ability to hinder the cold flow problem, PTFE impregnated with ground glass fiber was identified as the preferred material, most preferably containing ground glass fiber at a concentration of about 25 wt. % (available from B.F. Goodrich Co., Charlotte, N.C.). In addition, teflon foil inserts (not shown) in the original factory bearing bushings were eliminated, and the length of the bearing bushing was reduced by 10 mm.

The original lip seals and lip seal collars were also redesigned to address the wobble problem. The original factory lip seals, which were made of PTFE, were replaced with BUNA-based seals (#CR 50341) purchased from Chicago Rawhide of Elgin, Ill., a material preferred for use in the invention based on its resistance to cold flow. In addition, double-lipped seals were formed by compressing additional lip seals 208*b* within additional lip seal collars 208*a* and 208*c*. In the original factory filter seal assembly, the configuration of lips seals and lip seal collars above and below bearing bushing 202 was:

208*a*/208*b*/208*c*/202/208*c*/208*b*/208*a*.

The preferred modified configuration is:

208*a*/208*b*/208*a*/208*b*/208*c*/202/208*c*/208*b*/208*a*/208*b*/208*a*, as shown in FIG. 6. These modifications provide a tighter and more durable seal, which is more capable of withstanding the forces generated by the filter shaft if any wobbling does occur during the rotation of the shaft.

Slurry from extractor V-101 enters first stage filter vessel F-103 through slurry inlet 16 and proceeds to fill annular chamber 22 of the filter vessel. Butane vapor forced out of the filter vessel as it is being filled with slurry is recirculated back to extractor V-101 to relieve some of the increasing pressure. When annular chamber 22 is filled with slurry, some of the slurry is preferably recirculated back to extractor V-101 to relieve some of the increasing pressure in the filter vessel. When filter vessel F-103 is full, the pressure therein exceeds the pressure in the extractor by about 5 psig (34 kPa) due to the increase in pressure of liquid slurry exiting the filter vessel relative to the pressure of vapor exiting the filter vessel.

The slurry within the filter vessel, which consists of cocoa solids suspended in miscella (i.e., a solution of the solvent, butane, and solutes, including cocoa butter), is then filtered through filter screens 24 on filter plates 10, through filter apertures 25 and down filter channel 26 to separate the cocoa solids from the miscella. During filtration, it is preferred to maintain some slurry recirculation to the extractor, as it might improve distribution of solids on the filters by minimizing the effects of gravity selection of fine versus coarse solids. Filter screens 24 preferably have a mesh of about 2400–2500 when the feedstock is cocoa; however, the mesh of the filter screens can be readily adjusted based on the substance being filtered and the desired effectiveness of filtration.

Filter plates 10 each contain a circular concave surface above which a filter screen 24 rests, such that there is a space between the filter screen and the bottom of the filter plate. Filter screens 24 are preferably of the stainless steel construction type commonly found in the pharmaceutical industry.

Filtration is initiated by opening filtrate valve 28 downstream of filtrate outlet 18 to establish fluid communication between annular chamber 22, at a pressure of about 60 psig (414 kPa), and butter filtrate receiver V-103, at a pressure of about 45–55 psig (310–379 kPa). The pressure differential is maintained during filtration by backfilling first stage filter vessel F-103 with butane vapor from butane vaporizer E-101. The filtrate is preferably monitored for turbidity, with any filtrate having an unacceptable level (as determined by commercial considerations) of cocoa solids content being recirculated back to extractor V-101 rather than into butter filtrate receiver V-103. Filtration is terminated when the totalizer (not shown) setpoint is reached. Based on the solvent-to-feed ratio, the total amount of liquid passed through the filter is calculated to place the desired amount of solids on the filter plates (preferably about a one inch thick layer and/or a layer of about 400 lbs./181 kg).

Filtration is terminated prematurely under two conditions: (1) the pressure drop across the filter becomes too great (e.g., about 10 psig); or (2) vapor bubbles start forming in the outlet line, which renders the totalizer measurement useless. Vapor bubbles are indicated by erratic behavior of the flow measurement with confirmation visually in the site glass. Premature termination of the filtration process is typically caused by screen plugging or an excessive amount of fines in the slurry.

After filtration, first stage filter vessel F-103 contains unfiltered slurry in heel 14, and cocoa powder cakes laden with unfiltered miscella globules (in which the fat content preferably constitutes no more than 5 wt. % of the total fat in the feedstock) on filter screens 24, under a butane vapor atmosphere of about 60 psig (414 kPa). The unfiltered slurry is drained from heel 14 by opening drain pipe valve 30 to establish fluid communication between annular chamber 22, at a pressure of about 60 psig (414 kPa), and extractor V-101, at a pressure of about 45–55 psig (310–379 kPa). The pressure differential is maintained during draining by backfilling first stage filter vessel F-103 with butane vapor from butane vaporizer E-101.

After conveying the unfiltered slurry back to extractor V-101, the pressure in first stage filter vessel F-103 is lowered by terminating the flow of butane vapor into the filter vessel and permitting some of the existing butane vapor in the filter vessel to flow to extractor V-101 until the pressures in the filtration vessel and extractor are equalized. Drain pipe valve 30 is then closed.

The laden miscella particles are then washed from the filter cakes by introducing hot liquid butane from liquid butane heater E-102 into annular chamber 22. The liquid butane is preferably at a temperature of about 100–120° F. (38–49° C.), more preferably about 110° F. (43° C.). When annular chamber 22 is filled with liquid butane, motor 32 is actuated, causing filter shaft 12 and filter plates 10 to rotate within the liquid butane bath. The filter cakes are thereby washed from filter plates 10 to form a filter cake slurry of cocoa solids suspended in liquid butane. Any miscella globules trapped by the filter cake are diluted into the liquid butane-rich filter cake slurry. In order to facilitate thorough mixing of the slurry, the contents of annular chamber are preferably treated to several agitation cycles, with motor 32 remaining idle between cycles.

The cake wash slurry is driven from annular chamber 22 to cake wash receiver V-102 by a pressure differential between the annular chamber (which returned to a pressure of about 60 psig (414 kPa) when filled with the liquid butane) and the cake wash receiver. Again, butane vapor is used to maintain the pressure in annular chamber 22 as the cake wash slurry drains therefrom.

The pressure in filter vessel F-103 is maintained above ambient pressure (i.e., about 1 atmosphere absolute or 101 kPa), more preferably above 25 psig (172 kPa) throughout repeated loading, unloading, filtering and washing steps.

The foregoing description of the operation of first stage filter vessel F-103 also describes the operation of first stage filter vessel F-101, which is identical to, and operates like, first stage filter vessel F-103. The two vessels work in tandem, with filter vessel F-101 lagging behind filter vessel F-103 so as to maximize productivity of the system. Thus, in preferred embodiments, filter vessel F-101 is starting to be filled with slurry from extractor V-101 as the slurry in filter vessel F-103 is starting to be filtered. The timing is such that the slurry is alternately being sent to either filter vessel F-101 or filter vessel F-103 with minimum disruption or delay between filling cycles. It is also within the scope of this invention to provide a greater or lesser number of filter vessels (as well as other components of the system) operating in conjunction with one another, so as to maximize the productivity of the system with respect to a particular job.

The term "semi-continuous" is used herein to describe a process such as that depicted in FIG. 1. A semi-continuous process, as used herein, differs from a batch process in that the flow of feedstock into and products out of a semi-continuous system is continuous through multiple feedstock loadings, and differs from a continuous process in that the flow of feedstock within the system is discontinuous (e.g., due to batch extraction and/or batch filtration within an otherwise continuous system).

The cake wash slurry from first stage filter vessels F-101 and/or F-103 is introduced into cake wash receiver V-102 until the latter is filled to about 80–90% of its total volume. The cake wash slurry is further mixed by agitator A-101 (preferably rotating blades) before being introduced into second stage (or "secondary") filter vessel F-104 and then second stage filter vessel F-102 with the assistance of cake wash receiver pump P-102. Cake wash receiver V-102 and second stage filter vessels F-102 and F-104 operate in combination much like extractor V-101 and first stage filter vessels F-101 and F-103.

The filtrate from second stage filter vessels F-102 and F-104 is drawn into second stage filtrate receiver V-104 by pressure differential, where the filtrate is mixed by an agitator (not shown, but preferably rotating blades). Any cake wash slurry remaining in heel 14 of second stage filter vessels F-102 and F-104 is drawn by pressure differential back into cake wash receiver V-102. Liquid miscella from second stage filtrate receiver V-104 is conveyed to extractor V-101 by second stage filtrate receiver pump P-104. In preferred embodiments of the present invention, the liquid content of the filter cakes in the second stage filter vessels after draining the vessels is not more than 5 wt. %, and the fat content in these "secondary" filter cakes constitutes no more than 1 wt. % of the total fat in the feedstock.

The second stage filter cakes, containing cocoa solids and small amounts of laden miscella, are dried with hot butane vapor from butane vaporizer E-101. The hot butane vapor vaporizes liquid butane in the filter cakes to form dried filter cakes containing cocoa solids and less than 1 wt. %, preferably less than 0.5 wt. % (based on the total weight of the cake), cocoa butter released from the vaporized butane liquid. The hot butane vapor passing through the second stage filter cakes is preferably recycled through compressors C-101 and C-102, condenser E-103 and liquid butane receiver V-108 to liquid butane storage vessel V-111. The butane vapor flow into each of the second stage filter vessels is terminated while the butane vapor already in each filter vessel is continuously drawn-off by suction into compressors C-101 and C-102 until the pressure in each filter vessel is reduced to ambient pressure (i.e., about 1 atmosphere absolute or 101 kPa). The second stage filter vessels are then sealed and any increase in pressure due to evaporation of residual butane liquid is detected. If the pressure increase exceeds a predetermined amount over a predetermined length of time (preferably selected to show removal of at least 98 wt. %, more preferably at least 99.5 wt. %, of the butane from each filter vessel), then fluid communication between the filter vessels and the compressors is re-established, and additional amounts of butane vapor are drawn from the filter vessels. In embodiments, it was found that 98 wt. % of butane was removed when the pressure of the second stage filter did not rise more than 3 psig (21 kPa) in 2 minutes. The correspondence between the rate of pressure increase and the percentage (e.g., wt. %) of solvent residue in the filter cakes for a filter vessel of a given volume can be experimentally determined by calibrating the rate of pressure increase against the known percentage of residual solvent in a variety of filter cakes.

Figure 5:
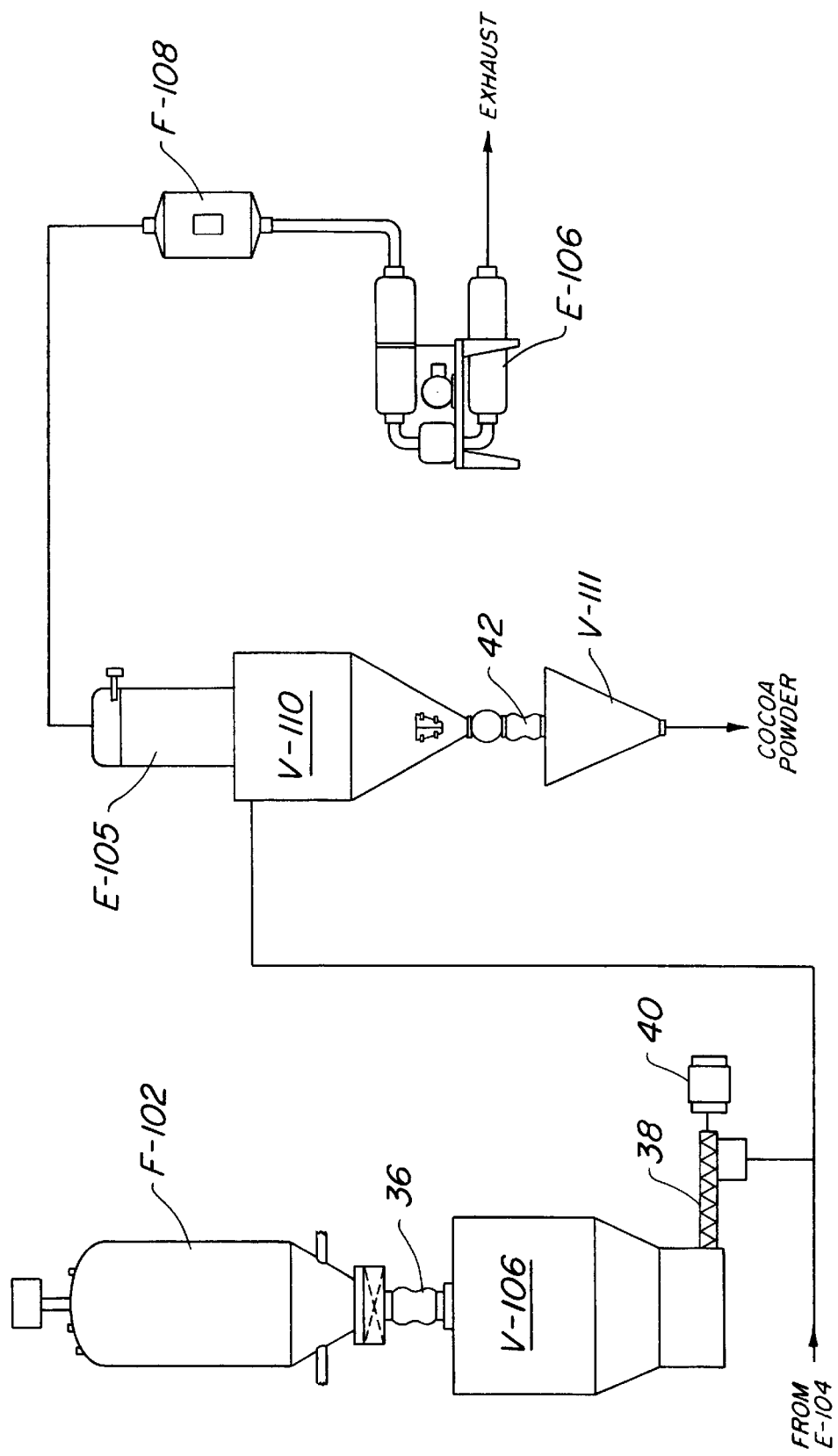
FIG. 5 is an expanded schematic view of the air conveying system of the embodiment of FIG. 1.

Once the contents of the second stage filter vessels pass the foregoing pressure test, slide gate 34 of each filter vessel is opened and filter plates 10 are rotated by motor 32. The filter cakes are slung from filter plates 10 by centrifugal force against the inside walls of each filter vessel, thereby breaking the filter cakes into smaller pieces (i.e., powder), which fall down annular chamber 22 into heel 14 and are further granulated to form cocoa powder by rotating arms (not shown) in heel 14. Referring to FIG. 5, the cocoa powder falls through slide gate 34 and transfer boot 36 into cake hoppers V-105 (not shown) and V-106 (respectively corresponding to second stage filter vessels F-104 and F-102). Suitable holding and transfer hoppers are available from Schick Tube-Veyor Corp. of Kansas City, Mo. The mass of cocoa powder in the hoppers helps to maintain a seal between the butane-rich hoppers and the air-rich atmosphere downstream of the hoppers.

Butane vapor within the cake hoppers and transfer boot 36, and residual butane vapor descending from second stage filter vessels F-102 and F-104 with the cocoa powder, combine to create a vapor seal against the infiltration of air into the system. Butane vapor can be added to each hopper as necessary to create and/or maintain this vapor seal, if needed. Each hopper is also provided with a pressure release valve (not shown) to release excess butane vapor to the external atmosphere, if necessary.

Auger 38 is provided at the base of each hopper for metered release of cocoa powder into a stream of heated and dehumidified air drawn from dehumidifier (not shown), located upstream of the hoppers, by vacuum blower E-106, located downstream of the hoppers. The release of cocoa powder and associated (residual) butane into the airstream by auger 38 is monitored by computer (not shown) to avoid creating an explosive mixture of air and butane. The feed rate of auger motor 40 can be manually set by the operator. In embodiments, the rate is set to auger one load from each filter vessel in about 20 minutes; however, the rate can be adjusted up or down as desired. The computer monitors whether the concentration of solvent in the air is within the flammability (or explosive) limits of the solvent. In the case of butane, which has a lower flammability limit of 1.8 vol. % and an upper flammability limit of 8.4 vol. %, the computer preferably sounds an alarm and/or adjusts the auger's feed rate if the concentration of butane approaches 1.8 to 8.4 vol. % in the air immediately downstream of auger motor 40. More preferably, the computer is programmed to prevent the concentration of butane in air from being less than 10 times greater than the upper flammability limit of butane and/or more than 10 times less than the lower flammability limit of butane.

In embodiments, the defatted powder is fed from the auger at a feed rate of about 0.9 to about 23 kg/min.

The cocoa powder and butane entrained in the airstream are carried to cocoa powder bin V-110. Cocoa powder descends through flexible sleeve 42 into bagger hopper V-111 and is packaged in, e.g., 50 lb (23 kg) bags for distribution to cocoa powder consumers. Dust collector E-105, located on top of cocoa powder bin V-110 and upstream of vacuum blower E-106, further reduces the possibility of an explosion by preventing the formation of cocoa powder clouds above the compacted cocoa powder in the bin, and by venting residual butane vapor from the bin. Vacuum blower E-106 draws the contents of the dust collector through safety filter F-108 before releasing the filtered contents to the external atmosphere.

The cocoa powder collected in bagger hopper V-111 is preferably ready for consumption without further processing. In preferred embodiments, the cocoa powder in the bagger hopper is sufficiently fine that at least 95 wt. %, more preferably at least 99.5 wt. %, of the cocoa powder will pass through a 200-mesh screen. Further, the cocoa powder preferably contains less than 1 wt. %, more preferably less than 0.5 wt. % fat, and less than 5 ppm, more preferably less than 3 ppm butane.

In preferred embodiments, cocoa butter is recovered from the system by the following steps. Miscella is drawn from butter filtrate receiver V-103 to separator V-112 by the pressure differential between the two vessels facilitated by butter filtrate receiver pump P-103. Separator V-112 separates the miscella into its components of butane and cocoa butter by vaporizing the liquid butane in the miscella. A suitable separator can be obtained from Atlanta Technology Group (ATG) of Atlanta, Ga. Other suitable separators are described in, e.g., U.S. Pat. No. 2,560,935 to Dickinson, U.S. Pat. No. 5,041,245 to Benado and U.S. Pat. No. 6,066,350 to Purtle et al. As it is preferable to maintain the temperature of the cocoa butter below about 130° F. (54° C.) preferably below about 110° F. (43° C.) to avoid damaging fatty acids therein, it is preferred to vaporize the liquid butane at reduced pressure (e.g., about 0.1 psia (0.69 kPa absolute)). The butane vapor is condensed back to liquid after being separated from the cocoa butter and then conveyed to liquid butane storage vessel V-111. The cocoa butter from separator V-112 is introduced into butter tank V-109, where it is held at about 100–130° F. (38–54° C.), preferably at about 110° F. (43° C.) for shipment to cocoa butter consumers. Cocoa butter in butter tank V-109 is preferably stored with constant mixing. It is particularly preferred to mix the cocoa butter by constantly recirculating the contents of butter tank V-109 through a recirculation line (not shown) outside of butter tank V-109. The cocoa butter from butter tank V-109 is preferably pumped by a butter tank pump through sieve and magnet filters (not shown) before being delivered to consumers.

The cocoa butter preferably contains less than 5 ppm, more preferably less than 3 ppm butane, and/or has a d/q value of at least 0.18 and a beta value of at least 35%. The embodiment shown in the figures can extract cocoa butter from at least 13,600 kilograms of chocolate liquor per day, yielding products at rates of 272–363 kilograms of cocoa powder per hour and 295–393 kilograms of cocoa butter per hour.

Preferred embodiments of the invention enjoy several advantages relative to other systems, including the following:

(a) Recovery of solids from the system does not require removal and/or disassembly of system parts. Systems such as those of U.S. Pat. No. 5,739,364 to Franke teach removing filter screens to recover solids, whereas the present invention slings solids from the filter screens using centrifugal discharge filter vessels.

(b) There is reduced solvent foaming, which eliminates fat/oil carry-over with the solvent that is transported back to the solvent storage tank.

(c) Mixing solvent and feedstock at about the same temperature to produce a slurry avoids solvent flashing, and improves energy efficiency.

(d) The solvent need not be periodically stressed (e.g., by sonification or pressure fluctuation) to achieve satisfactory product yields. Thus, the complexity of systems such as those of, e.g., Franke, which teaches the advantages of periodic stressing, is avoided.

(e) There is no need to employ an inert gas in the system, as taught by, e.g., Franke, thereby avoiding the problem of separating the inert gas from any solvent vapor present in the system. The invention is preferably conducted under an atmosphere consisting essentially of solvent vapor. In embodiments, at least 95 wt. %, more preferably at least 99 wt. %, of the atmosphere (i.e., the totality of gaseous materials within a given volume, as defined herein) is solvent vapor. In embodiments wherein the atmosphere consists of solvent vapor and air, the concentration of solvent vapor in the air should be outside the flammability limits (if any) for the particular solvent vapor. For example, in embodiments containing a butane vapor/air atmosphere, the concentration of butane vapor in the air is more than 8.4 vol. % (15.6 wt. %), more preferably at least 89 vol. % (94.2 wt. %), even more preferably at least 99 vol. % (99.5 wt. %). In embodiments, at least 99 wt. % of the atmosphere is solvent vapor, the atmosphere is oxygen-free, and/or the atmosphere is free of inert gases (i.e., chemically unreactive gases, such as nitrogen, etc.).

(f) Operating pressures can be subcritical. In certain preferred embodiments employing butane as the solvent and solvent vapor, operating pressures within the pressurized portions of the apparatus do not exceed about 75 psig (517 kPa). Supercritical extraction with carbon dioxide, such as disclosed in U.S. Pat. No. 3,923,847 to Roselius et al., is conducted at much higher pressures (e.g., 200–400 atm) in much more expensive vessels.

(g) Proteins present in the feedstock remain with the solids while fat is removed, resulting in cocoa powder having an increased percentage of protein.

(h) Bacterial contamination and growth are hindered by the anaerobic conditions throughout much of the system.

(i) The system can be constructed in process modules (e.g., two filters and two holding tanks and necessary piping), which facilitates ready adaption to varying production constraints, and relative portability.

One such process module of the invention is denoted "the Butane Skid" and relates to the devices used to manage all butane used in the process. The Butane Skid includes six elements which may be loosely grouped as a storage subsystem, a production subsystem and a recovery subsystem. The storage subsystem comprises the liquid butane storage vessel V-111, for storing all clean butane liquid in the system, whether it is delivered by truck or recovered from the solvent recovery skid. The production subsystem comprises the butane vaporizer E-101 for the production of butane vapor and the liquid butane heater E-102 for the production of heated liquid butane. From the production subsystem flows all butane liquid and butane vapor used in the system. The recovery subsystem comprises compressors C-101 and C-102, condenser E-103, and liquid butane receiver V-108. The recovery sub-system recovers excess butane vapor from all other components of the system and thus maintains the system in an equalized balance. Condenser E-103 condenses the vapor into a liquid via C-101/C-102, and saves the liquid butane in the liquid butane receiver V-108 until a sufficient amount is accumulated for return back into liquid butane storage vessel V-111.

If the pressure in condenser E-103 exceeds by a predetermined value (e.g., 5 psig/34 kPa) the vapor pressure of the solvent at the temperature in the condenser, air accumulated within the condenser (which is preferably placed at the highest point of the system so as to collect air that rises to the top of the heavier solvent vapor) is released to the atmosphere.

Replenishment of trace amounts of butane lost by bleed-off valves and the like is made through the butane storage tank V-111.

While the invention has been described in detail and with reference to specific examples thereof, it will be apparent to one skilled in the art that various changes and modifications can be made therein without departing from the spirit and scope thereof.

What is claimed is:

1. A process for extracting a fat from a feedstock, said process comprising:

mixing said feedstock with a solvent to form a primary slurry of feedstock solids suspended in a primary miscella comprising said solvent and said fat extracted from said feedstock, wherein said solvent is a liquefied gas;

filtering said primary slurry to provide: (a) at least one primary filter cake comprising said feedstock solids and a retentate portion of said primary miscella, and (b) a primary filtrate comprising a filtrate portion of said primary miscella;

washing said at least one primary filter cake with an additional amount of said solvent to form a cake wash slurry comprising said feedstock solids suspended in a secondary miscella comprising said additional amount of said solvent and an amount of said fat extracted from said feedstock;

filtering said cake wash slurry to provide: (a) at least one secondary filter cake comprising said feedstock solids, and (b) a secondary filtrate comprising said secondary miscella;

drying said at least one secondary filter cake with a solvent vapor to provide at least one dried filter cake, wherein said solvent vapor comprises said solvent in a gaseous form;

granulating said at least one dried filter cake to form a defatted powder;

feeding said defatted powder into an oxygen-containing atmosphere at a feed rate to remove at least a portion of a residual amount of said solvent remaining in said defatted powder and provide a powder product, wherein said feeding is regulated to avoid providing a flammable concentration of said solvent in said oxygen-containing atmosphere; and separating said solvent from said fat in said primary miscella to provide a fat product, wherein said mixing, said primary slurry filtering, said washing, said cake wash slurry filtering, said drying, and said granulating are conducted under an atmosphere consisting essentially of said solvent vapor.

2. The process of claim 1, wherein said fat is a member selected from the group consisting of cocoa butter, peanut oil, soybean oil, corn oil, rapeseed oil, flaxseed oil, cottonseed oil, olive oil, rice bran oil, linseed oil, palm oil, coconut oil, sunflower oil, safflower oil and canola oil.

3. The process of claim 1, wherein said feedstock comprises at least one of a fat-bearing animal product and a fat-bearing vegetable product.

4. The process of claim 1, wherein said feedstock is a product of cocoa beans, said feedstock solids comprise cocoa powder and said fat comprises cocoa butter.

5. The process of claim 1, wherein said feedstock is chocolate liquor, said feedstock solids comprise cocoa powder and said fat comprises cocoa butter.

6. The process of claim 5, wherein said solvent is butane and wherein said solvent and said feedstock are combined at a solvent:feedstock addition rate of 1:1 to 5:1 to provide a solvent:feedstock weight ratio of 1:1 to 5:1.

7. The process of claim 6, wherein a solvent temperature of said solvent and a feedstock temperature of said feedstock during said mixing are from 32.2–54.4° C., and said solvent temperature is within 10° C. of a feedstock temperature.

8. The process of claim 7, wherein said mixing is conducted for at least 30 minutes.

9. The process of claim 7, wherein: (a) said primary slurry filtering and said washing are conducted in at least one filter vessel; (b) said at least one filter vessel has a plurality of rotatable filter plates; and (c) said filter plates are rotated to discharge said at least one primary filter cake into said additional amount of solvent and to agitate said cake wash slurry.

10. The process of claim 9, wherein: (a) said cake.wash slurry filtering, said drying and said granulating are conducted in at least one filter vessel; (b) said at least one filter vessel has a plurality of rotatable filter plates; and (c) said granulating comprises rotating said filter plates to sling said at least one dried filter cake against an internal wall of said filter vessel to provide filter cake chunks, and grinding said filter cake chunks to provide said defatted powder.

11. The process of claim 10 wherein said separating comprises heating said primary filtrate to about 49° C. at a pressure of 0.69 kPa absolute.

12. The process of claim 10, wherein said fat product is cocoa butter containing less than 5 ppm butane, and having a d/q value of at least 0.18 and a beta value of at least 35%.

13. The process of claim 10, wherein said powder product is cocoa powder sufficiently fine that at least 95 wt. % of said cocoa powder will pass through a 200-mesh screen, and wherein said cocoa powder contains less than 1 wt. % fat and less than 5 ppm butane.

14. The process of claim 1, wherein said solvent is a hydrocarbon having a carbon number less than six.

15. The process of claim 1, wherein said solvent is butane or propane.

16. The process of claim 1, wherein said solvent is butane.

17. The process of claim 1, wherein said retentate portion contains no more than 5 wt. % of said fat in said feedstock and said filtrate portion contains no less than 95 wt. % of said fat in said feedstock.

18. The process of claim 1, wherein: (a) said primary slurry filtering and said washing are conducted in at least one filter vessel; (b) said at least one filter vessel has a plurality of rotatable filter plates; and (c) said filter plates are rotated to discharge said at least one primary filter cake into said additional amount of solvent and to agitate said cake wash slurry.

19. The process of claim 1, wherein said at least one secondary filter cake further comprises less than 0.5% fat content based on a total weight of said secondary filter cake.

20. The process of claim 1, wherein said secondary miscella is conveyed to an extractor in which said mixing is conducted.

21. The process of claim 1, wherein said solvent vapor used for said drying of said at least one secondary filter cake has a solvent vapor temperature of about 49° C. and a solvent vapor pressure of about 483 kPa.

22. The process of claim 1, wherein, after commencing said drying of said at least one secondary filter cake, a secondary filter vessel containing said at least one secondary filter cake is evacuated of said solvent vapor and depressurized to about ambient pressure, and wherein said drying is continued only if a secondary filter vessel pressure rises at a rate indicative of said at least one secondary filter cake containing more than 2 wt. % solvent.

23. The process of claim 1, wherein: (a) said cake wash slurry filtering, said drying and said granulating are conducted in at least one filter vessel; (b) said at least one filter vessel has a plurality of rotatable filter plates; and (c) said granulating comprises rotating said filter plates to sling said at least one dried filter cake against an internal wall of said filter vessel to provide filter cake chunks, and grinding said filter cake chunks to provide said defatted powder.

24. The process of claim 1, wherein said feed rate of said defatted powder is from about 0.9 to about 23 kg/min.

25. The process of claim 1, wherein said powder product is sufficiently fine that at least 95 wt. % of said powder product will pass through a 200-mesh screen.

26. The process of claim 1, wherein at least 99 wt. % of said atmosphere is said solvent vapor.

27. The process of claim 1, wherein said solvent is butane and said feed rate is regulated to maintain a butane concentration in said oxygen-containing atmosphere above 8.4 vol. %.

28. The process of claim 1, wherein said atmosphere is free of oxygen gas.

29. The process of claim 28, wherein said atmosphere is free of inert gases.

30. The process of claim 1, conducted in the absence of periodically stressing said solvent.

31. The process of claim 1, wherein said mixing is conducted in an extractor, and an extractor pressure within said extractor is maintained above about 276 kPa throughout repeated loading and unloading of said extractor.

32. The process of claim 1, wherein said primary slurry filtering and said washing are conducted in a filter vessel, and a filter vessel pressure within said filter vessel is maintained above 172 kPa throughout repeated loading and unloading of said filter vessel.

33. The process of claim 1, wherein said mixing is conducted in a single extractor, and said process extracts fat from at least 13,600 kilograms of said feedstock per day.

34. The process of claim 33, wherein said process produces at least 272 kilograms of said powder product per hour and at least 295 kilograms of said fat product per hour.

35. In a solvent extraction process comprising loading into an extractor a first batch including a feedstock and a solvent, extracting into said solvent a fat from said feedstock, unloading from said extractor said first batch after said extracting, and repeating said loading, said extracting and said unloading at least once, the improvement wherein a pressure in said extractor is continuously maintained above atmospheric pressure throughout said loading, said extracting, said unloading and said repeating.

36. The improvement of claim 35, wherein said solvent is liquid butane.

37. The improvement of claim 36, wherein said fat is a member selected from the group consisting of cocoa butter, peanut oil, soybean oil, corn oil, rapeseed oil, flaxseed oil, cottonseed oil, olive oil, rice bran oil, linseed oil, palm oil, coconut oil, sunflower oil, safflower oil and canola oil.

38. The improvement of claim 36, wherein said feedstock is chocolate liquor and said fat is cocoa butter.

39. The improvement of claim 36, wherein said extractor is continuously maintained under an oxygen-free atmosphere throughout said loading, said extracting, said unloading and said repeating.

40. The improvement of claim 39, wherein said atmosphere consists essentially of a vapor of said solvent.

41. In a solvent extraction process comprising loading into an extractor a first batch including a feedstock and a solvent, extracting into said solvent a fat from said feedstock, unloading from said extractor said first batch after said extracting, and repeating said loading, said extracting and said unloading at least once, the improvement wherein said extractor is continuously maintained under an oxygen-free atmosphere throughout said loading, said extracting, said unloading and said repeating.

42. The improvement of claim 41, wherein said solvent is liquid butane.

43. The improvement of claim 42, wherein said fat is a member selected from the group consisting of cocoa butter, peanut oil, soybean oil, corn oil, rapeseed oil, flaxseed oil, cottonseed oil, olive oil, rice bran oil, linseed oil, palm oil, coconut oil, sunflower oil, safflower oil and canola oil.

44. The improvement of claim 42, wherein said feedstock is chocolate liquor and said fat is cocoa butter.

45. The improvement of claim 42, wherein a pressure in said extractor is continuously maintained above 276 kPa throughout said loading, said extracting, said unloading and said repeating.

46. The improvement of claim 45, wherein said atmosphere consists essentially of a vapor of said solvent.

47. In a solvent extraction process comprising loading into an extractor a first batch including a feedstock and a solvent, extracting into said solvent a fat from said feedstock, unloading from said extractor said first batch after said extracting, and repeating said loading, said extracting and said unloading at least once, the improvement wherein said extractor is continuously maintained under an atmosphere consisting essentially of a vapor of said solvent throughout said loading, said extracting, said unloading and said repeating.

48. The improvement of claim 47, wherein said solvent is liquid butane.

49. The improvement of claim 48, wherein said fat is a member selected from the group consisting of cocoa butter, peanut oil, soybean oil, corn oil, rapeseed oil, flaxseed oil, cottonseed oil, olive oil, rice bran oil, linseed oil, palm oil, coconut oil, sunflower oil, safflower oil and canola oil.

50. The improvement of claim 48, wherein said feedstock is chocolate liquor and said fat is cocoa butter.

51. The improvement of claim 48, wherein a pressure in said extractor is continuously maintained above 276 kPa throughout said loading, said extracting, said unloading and said repeating.

52. The improvement of claim 51, wherein said extractor is continuously maintained under an oxygen-free atmosphere throughout said loading, said extracting, said unloading and said repeating.

* * * * *